Patented Aug. 14, 1945

2,382,212

UNITED STATES PATENT OFFICE 2,382,212

LINOLEUM COMPOSITIONS

Lawrence H. Dunlap, Lancaster, Pa., assignor to Armstrong Cork Company, Lancaster, Pa., a corporation of Pennsylvania No Drawing. Application March 21, 1942, Serial No. 435,715

7 Claims. (Cl. 260—23)

This invention or discovery relates to linoleum compositions and more particularly to linoleum cements; and it comprises a linoleum composition which includes a cement comprising a copolymer of a drying oil and a vinyl compound selected from the group consisting of styrene and acrylonitrile; all as more fully hereinafter set forth and as claimed.

The cements used in making linoleum usually contain as a characteristic ingredient a substance known as "linoxyn"; a product of the oxidation of drying oil. In linoleum manufacture, "linoxyn" is generally made by oxidizing linseed oil, by exposure to air. In oxidizing linseed oil by air blowing, the oil is thickened or bodied. A similar degree of bodying can be obtained by simply heating the linseed oil to a high temperature, higher than that used in air blowing, for a number of hours; this operation being called "polymerization," and, if carried to completion, resulting in ordinary "stand oil." Bodied products obtained from polymerization and by air blowing are different in character, but the same amount of bodying can be obtained in either way.

There are various well-known ways of making linoleum cement. In the so-called scrim or shed oil process and in the Walton process, the requisite oxidation and thickening of the oil is brought about by allowing the oil to slowly drip over a muslin sheet hung in festoons in sheds or by bringing it in other ways into contact with atmospheric oxygen. In another process, the oil is heated with driers, and air is blown through. In both processes, a semi-solid, plastic mass results which includes substantial portions of oxidized oil and linoxyn. Linoleum cements usually comprise this partially processed drying oil and a resin such as rosin, ester gum, Kauri gum and the like. Ordinarily linoleum cements comprise 65% to 85% partially processed drying oil and 15% to 35% resin. The drying oil generally employed is linseed oil but other oils such as soya bean oil and the like may be used. The product known to the art as linoleum is prepared by admixing the linoleum cement, comprising processed oil and resin, with a suitable filler such as cork, wood flour and the like and applying the same to a burlap foundation. A similar product, known as "linoflor," is made by applying such composition to a saturated felt foundation. It is essential, however, that the final product contain a substantially completely polymerized or oxidized or coagulated oil or linoleum cement. It is, therefore, necessary that the product undergo a further process of polymerization or oxidation or coagulation, depending upon the type of cement used, to render it sufficiently hard to be commercially serviceable. This further process of polymerization or oxidation or coagulation is necessarily carried out after the product of the mixing operation has been consolidated. This process is usually referred to as seasoning, stoving, curing or maturing, and is hereinafter referred as maturing. The maturing stage is usually carried out in a warm stove and is expensive, as it takes a considerable time, several weeks or so, to mature the linoleum sufficiently for commercial usage.

Linoleum prepared from the linoleum compositions of the prior art is readily damaged by exposure to alkali in that its alkali resistance is very low. This lack of alkali resistance is primarily due to the linoleum cements heretofore utilized, and is very disadvantageous since linoleum is continually subjected to alkali contained in soaps, washing powders and other detergents generally employed in household cleaning. The result is that, because of this lack of alkali resistance, the service life of the linoleum is greatly reduced.

I have found that a linoleum composition having surprisingly good alkali resistance may be prepared by employing the usual pigments and fillers and a cement comprising a copolymer of a drying oil and a vinyl compound selected from the group consisting of styrene and acrylonitrile.

The copolymer and method of preparing it are claimed in applicant's copending application, Serial No. 435,716, filed on March 21, 1942, entitled "Copolymerization of drying oils and vinyl compounds."

The copolymers which are employed as the linoleum cement, in the linoleum may be prepared by any method which may be known to the art. The preferred method may be briefly outlined as follows: A mixture of drying oil and vinyl compound of the type above described together with a small amount of an organic peroxide catalyst is charged into a suitable reaction vessel. The mixture is agitated and heated at an elevated temperature in the presence of a continuously renewed supply of an oxygen containing gas until copolymerization is substantially complete.

Among the oxidized drying oils which are suitable for preparing the copolymer are nonconjugated drying oils which are free of conjugated double bonds, such as linseed oil, soya bean oil, fish oil, and the like. The copolymers which I have found to be most suitable for use as the linoleum cement in the linoleum composition of my invention contain about 85% by weight to about 95% by weight of drying oil. When more than 95% by weight of drying oil is present, the copolymer tends to become soft and does not possess sufficient binding properties to develop a flexible sheet. When less than about 85% by weight of drying oil is present in the copolymer, the copolymer is too hard, and a rather brittle sheet is obtained when the linoleum composition is matured.

In a particular advantageous modification of my invention, a catalytic amount, that is about 0.5 to 1.5%, of an acid catalyst is added to the linoleum composition. The presence of this catalyst greatly accelerates the maturing time of the linoleum composition of my invention. Suitable compositions may be made without the addition of a catalyst, but the time required to mature the linoleum mix is quite long, and, therefore, such compositions are less desirable. Among the catalysts which I may employ are sulfuric acid, toluenesulfonic acid, ethyl sulfate, boron trifluoride and the like. I prefer to utilize boron trifluoride as the catalyst in my composition, since it produces a marked acceleration of maturing when used in relatively minute quantities. The acid catalyst is added in very small amounts either as a gas or in solution to the linoleum composition, advantageously at a period when the composition including the cement, the pigments and the fillers are undergoing the mixing operation.

The following specific examples are given by way of illustration of certain specific embodiments of my invention and not by way of limitation.

*Example 1.*—290 grams of a copolymer of a mechanically oxidized linseed oil which had been run for about six hours at 55° C. and styrene containing about 5% by weight of styrene, about 1% by weight of boron trifluoride, 400 grams of whiting, 203 grams of cork and 70 grams of wood flour were mixed, sheeted and matured for 36 days at about 170° F. At the end of the maturing time a hard, flexible, water resistant and alkali resistant linoleum was obtained.

*Example 2.*—The composition of this example and the method of treating it was similar to that of Example 1 with the exception that acrylonitrile was substituted for the styrene. The linoleum obtained was comparable in its water resistance, alkali resistance and flexibility to that produced by following Example 1.

The compositions and methods set forth in the above examples merely exemplify my invention and the compositions, methods and proportions of ingredients may be varied without departing from the scope of my invention.

The linoleum compositions of my invention are extremely resistant to alkali which resistance is primarily due to the particular type of binder or cement which is employed. The following test and results obtained therefrom clearly illustrate this remarkable property of alkali resistance. About two grams of copolymer cement were placed between folds of coarse, thin cloth at 8,000 per square inch, and uniform size strips were suspended in a 5% solution of sodium hydroxide for two hours. The strips were weighed before and after they had been immersed, washed and dried. The empty strip was also treated as a control. The per cent loss in weight was recorded. In the following table the per cent loss in weight recorded when the various copolymers were subjected to this test is shown:

Table 1

| Copolymer cement | Per cent loss |
|---|---|
| Cement of Example 1 | 5.0 |
| Cement of Example 2 | 4.8 |
| Typical linoleum cement | 84.0 |

From the above table, the remarkable alkali resistance of linoleum compositions including the cements of my discovery can be clearly seen. The cement containing linseed oil and rosin is typical of the linoleum cements of the prior art, and the per cent loss of weight of this type cement is greatly in excess of the per cent loss of weight of any of the copolymer cements set forth. This clearly indicates how much greater the alkali resistance of the composition of my invention is when compared to those of the prior art.

In addition to the surprisingly great alkali resistance of my composition, it is also water resistant, and upon subjection to maturing temperatures, develops a flexible, wear resistant sheet of linoleum.

Although my invention has been disclosed and described with reference to certain specific embodiments and specific examples thereof, I do not intend that my invention be limited thereby, but it may be otherwise embodied and practiced within the scope of the appended claims.

I claim:

1. A linoleum composition comprising filler particles; and a binder therefor including a copolymer of drying oil free of conjugated double bonds, which oil has been oxidized, and a vinyl compound selected from the group consisting of styrene and acrylonitrile; said copolymer containing between 85% to 95% by weight of said oil, and said binder being characterized by exceptional resistance to attack by alkali when compared with a linseed oil-rosin type linoleum cement.

2. A linoleum composition comprising filler particles; a binder therefor including a copolymer of drying oil free of conjugated double bonds, which oil has been oxidized, and a vinyl compound selected from the group consisting of styrene and acrylonitrile, said copolymer containing between 85% to 95% by weight of said oil; and an acid catalyst for polymerization of said oil; said binder being characterized by exceptional resistance to attack by alkali when compared with a linseed oil-rosin type linoleum cement.

3. A linoleum composition comprising filler particles; a binder therefor including a copolymer of oxidized linseed oil, and a vinyl compound selected from the group consisting of styrene and acrylonitrile, said copolymer containing between 85% to 95% by weight of said oxidized oil; and an acid catalyst for polymerization of said oil; said binder being characterized by exceptional resistance to attack by alkali when compared with a linseed oil-rosin type linoleum cement.

4. A linoleum composition comprising filler particles; a binder therefor including a copolymer of oxidized linseed oil and a vinyl compound selected from the group consisting of styrene and acrylonitrile, said copolymer containing between 85% and 95% by weight of said linseed oil; and a catalytic amount of boron trifluoride for polymerization of the oil; said binder being characterized by exceptional resistance to attack by alkali when compared with a linseed-oil-rosin type linoleum cement.

5. A linoleum composition comprising filler particles; a binder therefor including a copolymer of drying oil free of conjugated double bonds, which oil has been oxidized, and a vinyl compound selected from the group consisting of styrene and acrylonitrile, said copolymer containing between 85% to 95% by weight of said oxidized oil; and a catalytic amount of boron trifluoride for polymerization of said oil; said binder being characterized by exceptional resistance to attack by alkali when compared with a linseed oil-rosin type linoleum cement.

6. A linoleum composition comprising filler particles; a binder therefor including a copolymer of drying oil free of conjugated double bonds, which oil has been oxidized, and a vinyl compound selected from the group consisting of styrene and acrylonitrile, said copolymer containing between 85% to 95% by weight of said oil; and a catalytic amount of sulfuric acid for polymerization of said oil; said binder being characterized by exceptional resistance to attack by alkali when compared with a linseed oil-rosin type linoleum cement.

7. A linoleum composition comprising filler particles; a binder therefor including a copolymer of drying oil free of conjugated double bonds, which oil has been oxidized, and a vinyl compound selected from the group consisting of styrene and acrylonitrile, said copolymer containing between 85% to 95% by weight of said oil; and a catalytic amount of toluene-sulfonic acid for polymerization of said oil; said binder being characterized by exceptional resistance to attack by alkali when compared with a linseed oil-rosin type linoleum cement.

LAWRENCE H. DUNLAP.

CERTIFICATE OF CORRECTION.

Patent No. 2,382,212. August 14, 1945.

LAWRENCE H. DUNLAP.

It is hereby certified that error appears in the printed specification of the above numbered patent requiring correction as follows: Page 1, second column, line 3, after "referred" insert --to--; line 43-44, for "nonconjugated" read --unconjugated--; page 2, first column, line 52, after "8,000" insert --pounds--; and second column, line 60, claim 4, for "linseed-oil-rosin" read --linseed oil-rosin--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.

drying oil free of conjugated double bonds, which oil has been oxidized, and a vinyl compound selected from the group consisting of styrene and acrylonitrile, said copolymer containing between 85% to 95% by weight of said oil; and a catalytic amount of sulfuric acid for polymerization of said oil; said binder being characterized by exceptional resistance to attack by alkali when compared with a linseed oil-rosin type linoleum cement.

7. A linoleum composition comprising filler particles; a binder therefor including a copolymer of drying oil free of conjugated double bonds, which oil has been oxidized, and a vinyl compound selected from the group consisting of styrene and acrylonitrile, said copolymer containing between 85% to 95% by weight of said oil; and a catalytic amount of toluene-sulfonic acid for polymerization of said oil; said binder being characterized by exceptional resistance to attack by alkali when compared with a linseed oil-rosin type linoleum cement.

LAWRENCE H. DUNLAP.

CERTIFICATE OF CORRECTION.

Patent No. 2,382,212. August 14, 1945.

LAWRENCE H. DUNLAP.

It is hereby certified that error appears in the printed specification of the above numbered patent requiring correction as follows: Page 1, second column, line 3, after "referred" insert --to--; line 43-44, for "nonconjugated" read --unconjugated--; page 2, first column, line 52, after "8,000" insert --pounds--; and second column, line 60, claim 4, for "linseed-oil-rosin" read --linseed oil-rosin--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.